(12) United States Patent
Yu et al.

(10) Patent No.: US 9,217,408 B2
(45) Date of Patent: Dec. 22, 2015

(54) VENTILATING CONDITION DETERMINE METHOD OF IDLE STOP AND GO FUNCTION

(75) Inventors: Jiyong Yu, Pocheon-si (KR); Chongah Gwon, Hwaseong-si (KR); Junghwan Bang, Hwaseong-si (KR); Hyungjun Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 1006 days.

(21) Appl. No.: 13/291,694

(22) Filed: Nov. 8, 2011

(65) Prior Publication Data

US 2012/0282852 A1 Nov. 8, 2012

(30) Foreign Application Priority Data

May 3, 2011 (KR) ........................ 10-2011-0041965

(51) Int. Cl.
*B60H 1/00* (2006.01)
*F02N 11/08* (2006.01)

(52) U.S. Cl.
CPC .......... *F02N 11/084* (2013.01); *B60H 1/00778* (2013.01); *B60H 1/00807* (2013.01); *F02D 2200/0416* (2013.01); *F02N 2200/122* (2013.01); *Y02T 10/48* (2013.01)

(58) Field of Classification Search
CPC ............ B60H 1/00778; B60H 1/00807; F02N 11/084; F02N 2200/122; F02D 2200/0416
USPC ............................................ 454/75; 701/112
See application file for complete search history.

(56) References Cited

U.S. PATENT DOCUMENTS

| 5,416,728 | A | * | 5/1995 | Rudzewicz et al. ................ 701/1 |
| 6,088,661 | A | * | 7/2000 | Poublon ........................ 702/130 |
| 6,532,926 | B1 | | 3/2003 | Kuroda et al. |
| 6,974,251 | B2 | * | 12/2005 | DeRonne et al. ............. 374/144 |

(Continued)

FOREIGN PATENT DOCUMENTS

| CN | 101813030 A | 8/2010 |
| JP | 2001-50074 A | 2/2001 |

(Continued)

OTHER PUBLICATIONS

Wakao et al, JP 2004-360580 A English machine translation, Dec. 24, 2004.*

(Continued)

*Primary Examiner* — Alissa Tompkins
*Assistant Examiner* — Phillip E Decker
(74) *Attorney, Agent, or Firm* — Morgan, Lewis & Bockius LLP

(57) ABSTRACT

A method of determining an Idle Stop and Go (ISG) ventilation condition may include an ISG restriction early step that calculates an expected external air temperature through modeling using information acquired from a vehicle and execute an ISG logic to determine whether ISG entrance is possible based on a current ventilation condition of the vehicle, an ISG restriction proceeding step that detects an voltage of an air-conditioning system, an ISG restriction ascertaining step that determines whether an ISG entrance condition is satisfied, wherein the ISG entrance condition includes comparing the expected external air temperature through modeling with a specific temperature and the voltage of the air-conditioning system with a specific voltage, and an ISG entrance step that controls an engine by performing the ISG entrance when the ISG entrance condition is satisfied.

5 Claims, 3 Drawing Sheets

(56) References Cited

U.S. PATENT DOCUMENTS

| | | | |
|---|---|---|---|
| 7,080,617 B2* | 7/2006 | You | 123/179.4 |
| 7,387,437 B2* | 6/2008 | Brown et al. | 374/141 |
| 7,562,698 B2* | 7/2009 | Fujiki et al. | 165/202 |
| 8,527,145 B2* | 9/2013 | Yu et al. | 701/36 |
| 8,577,514 B2* | 11/2013 | Kyrtsos et al. | 701/1 |
| 8,577,582 B2* | 11/2013 | Yu et al. | 701/112 |
| 8,690,729 B2* | 4/2014 | Gwon et al. | 477/94 |
| 8,712,673 B2* | 4/2014 | Gwon et al. | 701/112 |
| 8,766,787 B2* | 7/2014 | Yu et al. | 701/112 |
| 2004/0144107 A1* | 7/2004 | Breton et al. | 62/129 |
| 2006/0209921 A1 | 9/2006 | Brown et al. | |
| 2007/0246209 A1* | 10/2007 | Lee et al. | 165/202 |
| 2007/0272173 A1* | 11/2007 | Reckels et al. | 701/101 |
| 2008/0196962 A1* | 8/2008 | Capito | 701/51 |
| 2010/0107997 A1* | 5/2010 | Kojima | 123/41.12 |
| 2010/0222983 A1* | 9/2010 | Berr | 701/102 |
| 2011/0106505 A1* | 5/2011 | Hawkins et al. | 703/2 |
| 2013/0066583 A1* | 3/2013 | Foussard et al. | 702/130 |
| 2013/0218378 A1* | 8/2013 | Lindemann et al. | 701/22 |
| 2014/0123963 A1* | 5/2014 | Glugla et al. | 123/542 |

FOREIGN PATENT DOCUMENTS

| | | |
|---|---|---|
| JP | 2001-263123 A | 9/2001 |
| JP | 2004-360580 A | 12/2004 |
| JP | 2010-248918 A | 11/2010 |

OTHER PUBLICATIONS

Office Action dated Aug. 5, 2015 in Chinese Patent Application No. 201110384158.X.

* cited by examiner

FIG.2

AIR-CONDITIONING (COOLING/HEATING PERFORMANCE)
MODELING TABLE

| Time | 0V | 1.5V | 3V | 4.5V |
| --- | --- | --- | --- | --- |
| −10DEGREE | 20 | 10 | 5 | 0 |
| 0DEGREE | 100 | 50 | 20 | 0 |
| 10DEGREE | 150 | 100 | 50 | 0 |
| 20DEGREE | 200 | 150 | 100 | 0 |
| 30DEGREE | 150 | 100 | 50 | 0 |
| 40DEGREE | 100 | 5 | 5 | 0 |

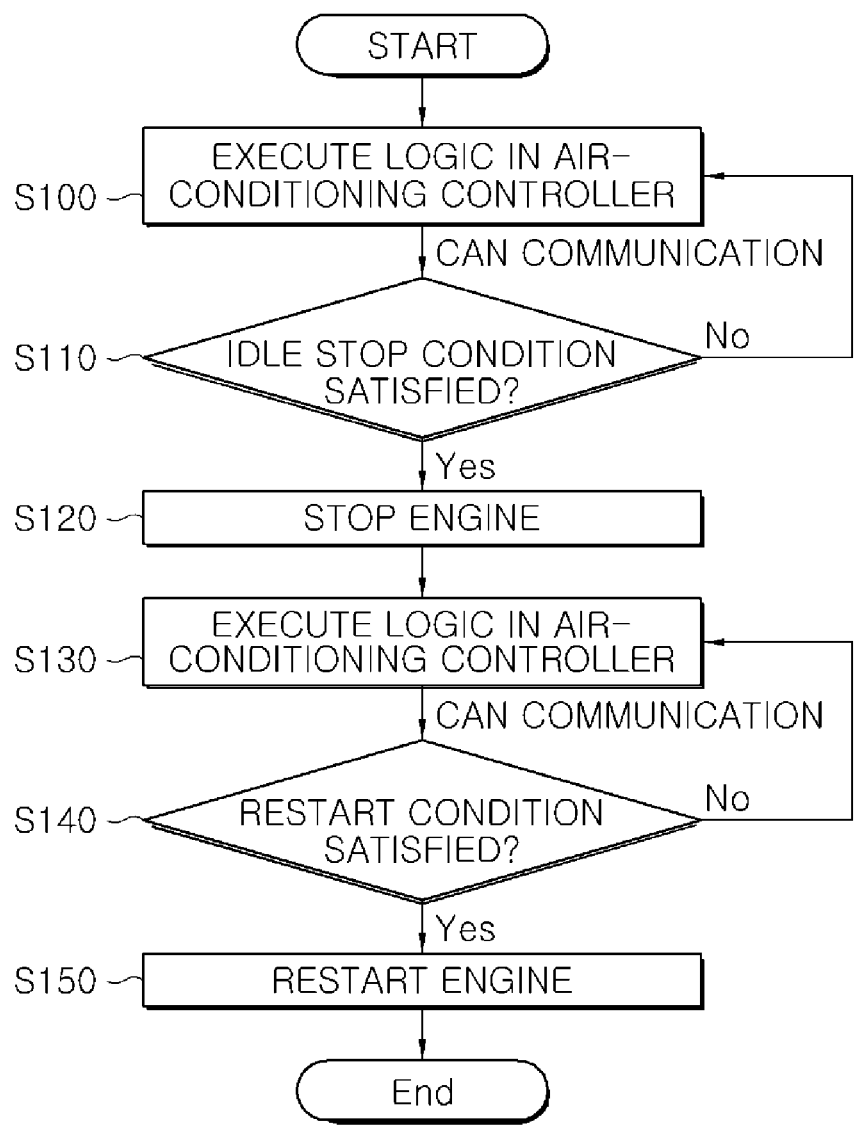

VENTILATING CONDITION DETERMINE METHOD OF IDLE STOP AND GO FUNCTION

CROSS-REFERENCE TO RELATED APPLICATION

The present application claims priority to Korean Patent Application Number 10-2011-0041965, filed on May 3, 2011, the entire contents of which application is incorporated herein for all purposes by this reference.

BACKGROUND OF INVENTION

1. Field of Invention

The present invention relates to an Idle Stop and Go (ISG) logic, and more particularly, to a method that can determining ventilation conditions for Idle Stop and Idle Go from ventilation state modeling using information that can be acquired from a vehicle without using additional expensive sensors.

2. Description of Related Art

In general, an Idle Stop and Go (ISG) function is for controlling stopping of idling of an engine and makes it possible to achieve economical effect of fuel by repeating starting and stopping of an engine in accordance with road conditions.

For this function, an ISG logic gives an order to stop the engine in idling in response to input information, such as the vehicle speed, engine speed, and the temperature of the cooling water. A vehicle provided with the ISG can achieve fuel efficiency saving of 5 to 15% in the actual fuel efficiency mode.

However, even in a vehicle provided with the ISG in which the fuel efficiency takes precedence, as described above, by setting restrictions that suppress performing of the ISG by ventilation conditions and battery conditions, safety and commercial value of the vehicle system in the vehicle provided with the ISG are improved.

For example, there is an idle stop and idle go function according to specific ventilation conditions, which is a method of keeping monitoring an air-conditioning system and stopping the ISG function from a result determined from the monitoring.

For this configuration, the air-conditioning system is equipped with a communication network and the communication network uses Controller Area Network (CAN) communication, Media Oriented Systems Transport (MOST) communication, or ITS Data Bus 1349 (IDB1349) communication.

FIG. 3 is a logic flowchart for monitoring ventilation conditions for preventing ISG by using hardware, such as an air-conditioning controller, sensors, and communication network and performing ISG restriction under specific conditions.

As described above, Step S100 is a process of monitoring ventilation conditions for preventing ISG in an air-conditioning controller of an air-conditioning system, in which temperature measurement information on cooling/heating-related devices which is measured by a sensor is provided to an air-conditioning controller through the CAN communication.

In Step S110, it is determined whether the ventilation conditions determined from the temperature information read from the sensor by the air-conditioning controller satisfy the idle stop conditions and then, when the idle stop conditions are satisfied, the engine keeps stopped, as in Step S120.

Next, the ventilation conditions for preventing ISG with the CAN communication is monitored again in the air-conditioning controller in the air-conditioning system, as in Step S130, and then it is determined whether the ventilation conditions determined by the monitoring satisfy the Idle Go condition, as in Step S140.

When the Idle Go condition is satisfied, the engine is restarted, as in Step S150.

However, in the hardware-typed method, the ventilation condition logic for determining Idle Stop and Idle Go is executed in the air-conditioning system, such that the air-conditioning system requires an air-conditioning controller for executing the ventilation condition logic.

The hardware-typed method requires various sensors for detecting temperature information from the cooling/heating-related devices and it is required to construct a CAN (or MOST or IDB1394) communication network in order to read the information detected by the sensor with the air-conditioning controller.

The air-conditioning controller, various sensors, and CAN (or MOST or IDB1394) communication network increase the cost for applying ISG and may not be applied due to insufficient layout in some cases, when vehicles that have been manufactured are provided with the ISG function.

In particular, since the ISG cannot be applied due to the layout of vehicles that have been manufactured, it is necessarily disadvantageous in using the ISG for following a fuel efficiency improvement policy regulated by rules.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention have been directed to provide a method of determining ISG ventilation conditions that can remove cost-increasing factors caused by additionally using expensive sensors and unavailability of ISG due to the layout of vehicles that have been manufactured which is caused by constructing a communication network for air-conditioning controller, by determining ventilation conditions for Idle Stop and Idle Go, by ventilation state modeling of a vehicle from information, such as output voltage of an air-conditioning system, and cooling water temperature, intake air temperature, and engine torque that can be acquired from the vehicle.

Exemplary methods of determining an Idle Stop and Go (ISG) ventilation condition according to the present invention may include an ISG restriction early step that calculates an expected external air temperature through modeling using information acquired from a vehicle and execute an ISG logic to determine whether ISG entrance is possible based on a current ventilation condition of the vehicle, an ISG restriction proceeding step that detects a voltage of an air-conditioning system, an ISG restriction ascertaining step that determines whether an ISG entrance condition is satisfied, wherein the ISG entrance condition includes comparing the expected external air temperature through modeling with a specific temperature and the voltage of the air-conditioning system with a specific voltage, and an ISG entrance step that controls an engine by performing the ISG entrance when the ISG entrance condition is satisfied.

The information that can be acquired from a vehicle may include a cooling water temperature, an intake air temperature, and an engine torque The condition for the ISG Go execution step may include the voltage of the air-conditioning system and the expected external air temperature through modeling, wherein the voltage of the air-conditioning system is a blower voltage.

The expected external air temperature may be through modeling is a modified engine room temperature calculated by multiplying an engine room temperature by a calibration factor considering time, wherein the engine room temperature is acquired in a 2-dimensional map composed of the engine torque and the cooling water temperature, and the calibration factor considering time is determined based on a correction factor, which is the difference between the expected external air temperature through modeling and an intake air temperature.

Exemplary methods according to the present invent may further include an ISG Go early step that calculates the expected external air temperature through modeling using information acquired from the vehicle and detects the voltage of the air-conditioning system to determine whether to restart the engine when an ISG Go condition in an ISG stop is satisfied after the ISG entrance step is performed, an ISG Go ascertaining step that determines whether an ISG GO condition is satisfied, wherein the ISG GO condition includes comparing an ISG stop time passage to a specific time passage and/or comparing the voltage of the air-conditioning system to another specific voltage, and an ISG Go execution step that performs an ISG Go and restarts the engine when the ISG Go condition is satisfied.

The specific time passage may be a value calculated according to the expected external air temperature calculated through modeling for the ISG entrance. The ISG Go condition may be satisfied when the Idle Stop time passage is longer than the specific time passage and/or the voltage of the air-conditioning system is higher than the another specific voltage.

According to exemplary methods of the present invention, since an ISG restriction logic of the air-conditioning system is performed only by software-typed ventilation state modeling using information that can be acquired from a vehicle, it is possible to prevent an increase in cost due to hardware, such as sensors and a communication network construction.

Further, according to exemplary methods of the present invention, since the ISG restriction logic is executed by software, such as a communication network construction, without using hardware, it is possible to remove the problem due to the layout of vehicles that have been manufactured, which makes it difficult to apply ISG, and considerably increase availability of the ISG.

In addition, according to exemplary methods of the present invention, since the ISG restriction logic is executed without using an air-conditioning controller, it is possible to mount the ISG even in a vehicle where an air-conditioning controller cannot be mounted.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table showing a correlation between voltage of an air-conditioning system and temperature in the operation of the air-conditioning system.

FIG. 3 shows a method of determining ventilation conditions in the related art for monitoring ventilation conditions for preventing ISG by using hardware, such as an air-conditioning controller, sensors, and communication network and performing ISG restriction under specific conditions.

Figure 1:
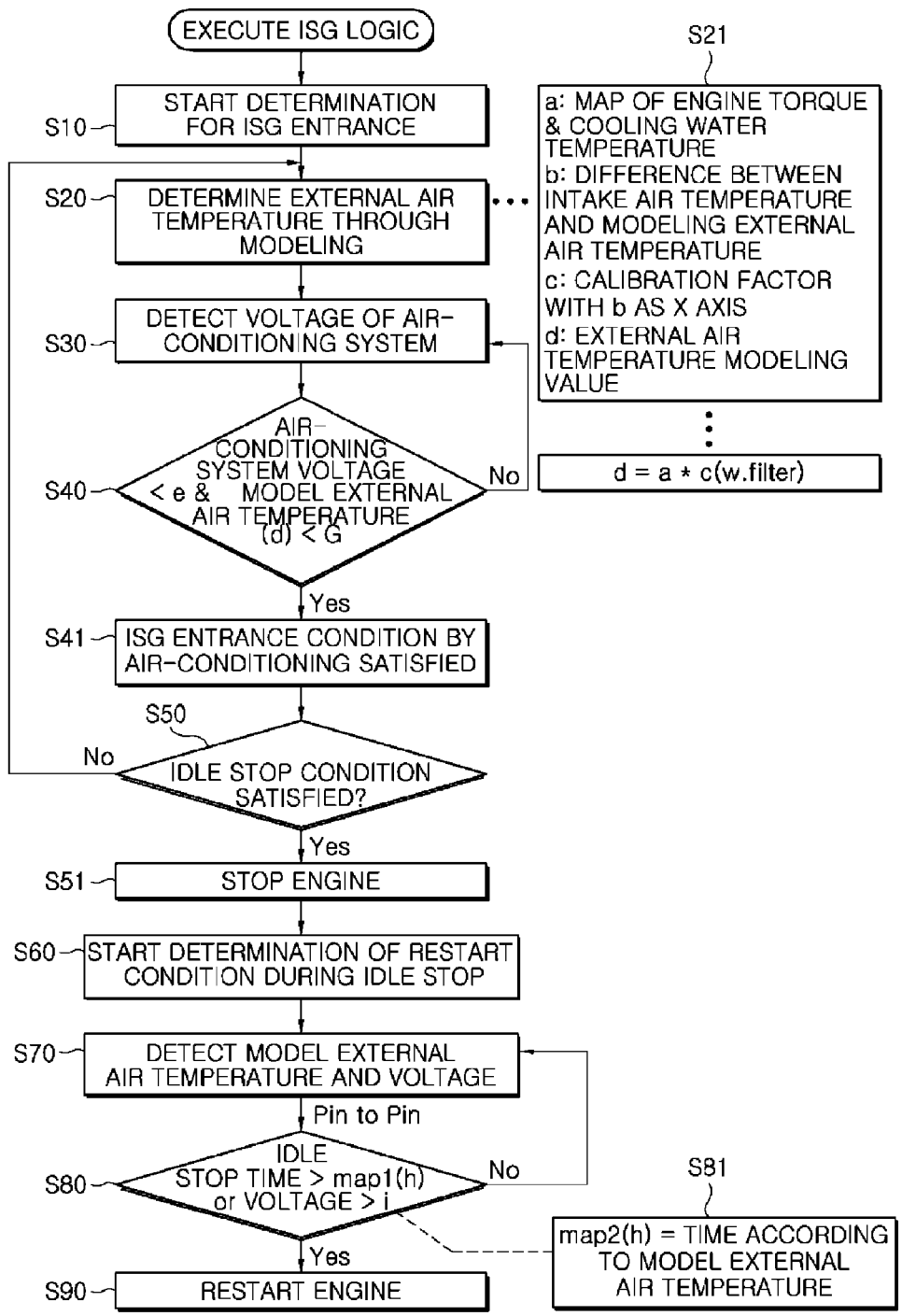
FIG. 1 is a flowchart showing an exemplary method of determining a software-typed ISG ventilation condition by using ventilation state modeling according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Referring to FIG. 1, Step S10 is a step of ascertaining whether Idle Stop and Go (ISG) entrance is possible with an ISG logic executed, which means determining whether ventilation conditions satisfy conditions preventing ISG entrance by using the ventilation conditions in ISG entrance.

Step S20 models external air temperature on the basis of the correlation between the engine room temperature and the intake air temperature and calculates a modeling value d of the external air temperature from the modeling.

In Step S21, the factor a is the engine room temperature, b is a correction factor according to the modeling, c is a calibration factor determined with b as an X axis, and d is the modeling value of the external air temperature.

The engine room temperature a is implemented by a 2D map composed of engine torque representing the load state of the engine and cooling water temperature, in which an offset factor is used for the cooling water temperature when a cooling fan operates.

The 2D Map is commonly used to analyze the relationship between the engine torque and the cooling water temperature.

The correction factor b represents the difference between the exterior air temperature and the intake air temperature which are modeled on the basis of the intake air temperature, information closest to the external air temperature.

The intake air temperature means a temperature value directly measured by a sensor.

The calibration factor c, as a time filter, smoothes time variation of the calculation value of the modeling by considering the characteristics of the external air temperature without a rapid change.

As described above, the modeling value d of the external air acquired in Step S20 is calculated from $d = a \times c$, in which d is used as the value of the engine room temperature considering the external air temperature. d is also referred to as the modified engine room temperature.

The variables and factors are determined by estimation or measurement of parameters for a vehicle and are not limited to specific values or specific methods.

Next, the voltage of the air-conditioning system is detected in Step S30, and the detected voltage value is used for modeling using the relationship between voltage and temperature, such that it is possible to calculate a relationship between the magnitude of voltage of the air-conditioning system and temperature according to heating/cooling of the air-conditioning system, or the reverse relationship.

In various embodiments, voltage output from a blower is used as the voltage of the air-conditioning system.

Referring to FIG. 2, it shows voltage value of the air-conditioning system for cooling/heating temperature by driving the air-conditioning system.

Step S40 is a process of determining whether it corresponds to the ISG entrance restriction conditions in ISG entrance by using the engine room temperature d calculated by the modeling and the detected voltage of the air-conditioning system.

This is determined by comparing the conditions to see whether the voltage of the air-conditioning system<e and modified engine room temperature d<g.

In the voltage of the air-conditioning system<e, e is a voltage value corresponding to a specific temperature in the table of FIG. 2, and accordingly, the voltage of the air-conditioning system<e represents that the detected voltage value is lower than the modeled voltage value of FIG. 2.

In modified engine room temperature d<g, g is a specific temperature in the table of FIG. 2.

When the condition of voltage of the air-conditioning system<e and the condition of modified engine room temperature d<g are simultaneously satisfied after performing Step S40, ISG entrance is performed, as in Step S41.

That is, Step S41 means that the ventilation condition does not relate to the Idle Stop condition restricting the ISG entrance, in the ISG entrance, such that Idle Go is performed and the engine is restarted.

A determination logic for the ventilation condition in ISG entrance which is executed in Step S10 and Step S41 can be performed independently by being independently added to the ISG logic.

Next, Step S50 and Step S51 mean that ISG is performed through determination of the ventilation condition in ISG entrance and then the engine stops in accordance with the Idle Stop condition.

Meanwhile, Step S60 to Step S90 are a logic that determines again whether the engine is restarted during Idle Stop and restarts the engine during the Idle Stop when the condition is satisfied, and it may be executed by being added to the ISG logic, independently from or together with the determination logic of the ventilation condition in the ISG entrance which is executed in Step S10 and Step S41 described above.

The restart of the engine means the Idle Go.

When the process enters a process of determining whether the engine is restarted during Idle Stop in Step S60, as in Step S70, the external air temperature and the voltage of the air-conditioning system are detected or calculated through modeling.

The logic used in Step S70 is basically the same as the logic used in Step S20 and Step S30 described above, such that the external air temperature through the modeling means the modified engine room temperature d (d=a×c) and the voltage of the air-conditioning system means the voltage measured in the air-conditioning system.

In Step S80, whether to restart the engine is determined by determining time passage of the Idle Stop or comparing voltage values of the air-conditioning system.

A map1(h) implies a comparing value that can be compared with time passage in the Idle Stop, such as when time passes and the engine should be restarted without charging a battery during the Idle Stop, and map1(h) includes time according to the external air temperature through modeling.

The map1(h) is calculated by using the map2(h), as in Step S81.

Accordingly, when at least one of a condition of Idle Stop time passage>map1(h) and the voltage of the air-conditioning system>i, which are compared in Step S80, is satisfied, the engine is restarted as in Step S90.

In the voltage of the air-conditioning system>i, i is a voltage value corresponding to a specific temperature in the table of FIG. 2, and accordingly, the voltage of the air-conditioning system>i represents that the detected voltage value is higher than the modeled voltage value of FIG. 2.

As described above, in various embodiments, the determination of the ventilation condition in the ISG entrance and the determination of whether to restart the engine during the Idle Stop can be implemented by a software-typed logic, not a hardware-typed method using the air-conditioning controller of the air-conditioning system, sensors, and communication network as in the related art, by acquiring the external air temperature information by the ventilation state modeling using the information (cooling water temperature, intake air temperature, engine torque, blower voltage in the air-conditioning system) which can be acquired from the vehicle.

Therefore, the problem due to the layout, which makes it difficult to use the ISG, of vehicles that have been manufactured is removed such that it is possible to greatly increase availability of the ISG, and particularly, it is possible to easily mount the ISG even in a vehicle where an air-conditioning controller cannot be mounted.

For convenience in explanation and accurate definition in the appended claims, the terms higher or lower, and etc. are used to describe features of the various embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling an engine of a vehicle having an Idle Stop and Go (ISG) function, the method comprising:
   an ISG restriction step that calculates, by a controller, an expected external air temperature through modeling using information acquired from the vehicle and executes an ISG logic to determine whether an ISG entrance is possible based on a current ventilation condition of the vehicle;
   an ISG restriction proceeding step that detects, by the controller, a voltage of an air-conditioning system of the vehicle;

an ISG restriction ascertaining step that determines, by the controller, whether an ISG entrance condition is satisfied, wherein the ISG entrance condition includes comparing the expected external air temperature through modeling with a specific temperature and the voltage of the air-conditioning system with a specific voltage; and an ISG entrance step that controls, by the controller, the engine by performing the ISG entrance when the ISG entrance condition is satisfied, wherein a condition for an ISG Go execution includes the voltage of the air-conditioning system and the expected external air temperature through modeling, wherein the voltage of the air-conditioning system is a blower voltage, wherein the expected external air temperature through modeling is a modified engine room temperature calculated by multiplying an engine room temperature by a calibration factor considering time, wherein the engine room temperature is acquired in a 2-dimensional map composed of the engine torque and the cooling water temperature, and the calibration factor considering time is determined based on a correction factor, which is the difference between the expected external air temperature through modeling and an intake air temperature.

2. The method as defined in claim 1, wherein the information acquired from the vehicle includes a cooling water temperature, an intake air temperature, and an engine torque.

3. The method as defined in claim 1, further comprising:
an ISG Go determination step that calculates, by the controller, the expected external air temperature through modeling using information acquired from the vehicle and detects the voltage of the air-conditioning system to determine whether to restart the engine when an ISG Go condition in an ISG stop is satisfied after the ISG entrance is performed;

an ISG Go ascertaining step that determines, by the controller, whether an ISG GO condition is satisfied, wherein the ISG GO condition includes comparing an ISG stop time passage to a specific time passage and/or comparing the voltage of the air-conditioning system to another specific voltage; and an ISG Go execution step that performs, by the controller, an ISG Go and restarts the engine when the ISG Go condition is satisfied.

4. The method as defined in claim 3, wherein the specific time passage is a value calculated according to the expected external air temperature through modeling calculated for the ISG entrance.

5. The method as defined in claim 3, wherein the ISG Go condition is satisfied when the Idle Stop time passage is longer than the specific time passage and/or the voltage of the air-conditioning system is higher than the another specific voltage.

* * * * *